United States Patent
Abe et al.

(10) Patent No.: US 6,309,621 B1
(45) Date of Patent: Oct. 30, 2001

(54) PROCESS FOR PRODUCING HIGH TEST HYPOCHLORITE AND CALCIUM CHLORIDE AQUEOUS SOLUTION

(75) Inventors: Yoshio Abe; Koichi Ohashi; Nobuyuki Gotoh, all of Yamagata; Tsugio Murakami, Yamaguchi, all of (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 09/559,549

(22) Filed: Apr. 28, 2000

(30) Foreign Application Priority Data

Apr. 28, 1999 (JP) .................................................. 11-122430

(51) Int. Cl.[7] ............................. C01B 11/06; C01F 11/24
(52) U.S. Cl. ............................................. 423/474; 423/497
(58) Field of Search .................................. 423/473, 474, 423/497

(56) References Cited

U.S. PATENT DOCUMENTS

| | | | | |
|---|---|---|---|---|
| 3,251,647 | * | 5/1966 | Nicolaisen | 423/374 |
| 3,895,099 | * | 7/1975 | Sakowski | 423/374 |
| 3,950,499 | * | 4/1976 | Miyashin et al. | 423/374 |
| 4,248,848 | * | 2/1981 | Murakani et al. | 423/474 |
| 4,348,371 | * | 9/1982 | Saeman | 423/475 |
| 4,348,372 | * | 9/1982 | Duncan et al. | 423/497 |
| 4,500,506 | * | 2/1985 | Morgan | 423/474 |
| 4,842,841 | * | 6/1989 | Saeman | 423/474 |
| 5,393,724 | * | 2/1995 | Okajima et al. | 502/402 |

FOREIGN PATENT DOCUMENTS 52-134895 * 11/1977 (JP) .

* cited by examiner

*Primary Examiner*—Ngoc-Yen Nguyen
(74) *Attorney, Agent, or Firm*—Sughrue, Mion, Zinn, Macpeak & Seas, PLLC

(57) ABSTRACT

An economical, industrial and ecologically-sound process for producing high test hypochlorite and a calcium chloride aqueous solution comprising the steps of (a) preparing milk of lime, (b) chlorinating the milk of lime to crystallize calcium hypochlorite dihydrate in the presence of the prismatic calcium hypochlorite dihydrate seed crystals having a specific habit to prepare a slurry of coarse calcium hypochlorite dihydrate crystals, (c) separating the slurry into a wet cake of calcium hypochlorite dihydrate crystals and a mother liquor containing calcium hypochlorite and calcium chloride, (d) drying the wet cake to provide high test hypochlorite, and (e) adding hydrochloric acid to the mother liquor or bringing the mother liquor into contact with an oxide of at least one of Mn, Fe, Co, Ni, Cu, and Pd to decompose the calcium hypochlorite to obtain a calcium chloride aqueous solution.

13 Claims, No Drawings

PROCESS FOR PRODUCING HIGH TEST HYPOCHLORITE AND CALCIUM CHLORIDE AQUEOUS SOLUTION

FIELD OF THE INVENTION

This invention relates to an economical, productive and ecologically-sound process for producing high test hypochlorite (chlorinated lime having a high available chlorine content), which is used as a bleaching agent or a bactericidal agent, and a calcium chloride aqueous solution, which is used as a snow-melting agent, a dusting agent, a coolant, etc.

BACKGROUND OF THE INVENTION

High test hypochlorite is generally obtained by drying calcium hypochlorite dihydrate, and calcium hypochlorite is produced through a diversity of processes. Most of known processes use as raw materials not only lime and chlorine but sodium hydroxide. Typical processes starting with lime, chlorine and sodium hydroxide are disclosed, e.g., in JP-A-50-87994 (The term "JP-A" as used herein means an "unexamined published Japanese patent application"), U.S. Pat. No. 3,251,647, and JP-A-52-134895.

In these processes using sodium hydroxide, calcium hypochlorite dihydrate crystals and sodium chloride crystals precipitate simultaneously, which are fractionated by classification. However, because of insufficient fractionation, both the resulting high test hypochlorite and the by-produced sodium chloride have had insufficient purity.

In order to eliminate the above problem, it seems the most reasonable to make calcium hypochlorite dihydrate by chlorinating lime without use of sodium hydroxide. In this case, the mother liquor comprises calcium chloride as a main component, which is of higher value of use than sodium chloride.

However, because calcium hypochlorite dihydrate crystals have difficulty in growing in the mother liquor comprising calcium chloride, the resulting crystals have the form of silk yarn, which are very difficult to collect by filtration, and the resulting filter cake has a low available chlorine concentration. Addition of water to the mother liquor to decrease the calcium chloride concentration could improve the crystal growth but deteriorates the water balance and the chlorine unit. In addition, the mother liquor becomes less valuable due to the reduced calcium chloride concentration.

JP-A-54-127897 proposes addition of specific prismatic seed crystals to a mother liquor to obtain coarse crystal grains of calcium hypochlorite dihydrate notwithstanding the high calcium chloride concentration of the mother liquor. According to this process, the filterability of the crystals is improved, decomposition during drying is suppressed, and the product has a high available chlorine content. However, the publication has no mention of specific examples of utilization, still less the quality, of the calcium chloride in the mother liquor. Since the mother liquor must contain calcium chlorate, calcium hydroxide, metallic impurities, etc. as well as calcium hypochlorite and calcium chloride, these by-products or impurities should be removed before the calcium chloride can be supplied as a commercial product, but the publication does not show the purification method.

U.S. Pat. Nos. 4,348,371 and 4,348,372 disclose recovery of calcium chloride and calcium chlorate from the mother liquor associated with the manufacture of a calcium hypochlorite product aiming at putting these by-products on the market. The process proposed comprises concentrating the mother liquor to collect calcium chloride crystals, further concentrating the resulting mother liquor to collect calcium chlorate crystals, and recycling the residual mother liquor to the calcium hypochlorite production step. However, the process is disadvantageous in that a large-sized installation and complicated steps are required; that there is a fear of accumulation of impurities, such as metallic compounds, originated in slaked lime as a raw material; and that calcium hypochlorite dihydrate crystals do not grow sufficiently in this recycle system and have poor filterability.

Additionally, since milk of lime from which calcium hypochlorite dihydrate is to be crystallized upon chlorination of lime should have a high concentration, the technique for preparing the milk of lime is bottleneck. In this connection, JP-A-54-127897 shows an example of mixing lime cake and the mother liquor from which calcium hypochlorite dihydrate crystals have been separated. According to the inventors study, it turned out that mere mixing is insufficient for dispersion, tending to form undissolved lumps of lime powder. Such lumps of powder not only make chlorination difficult but may be collected together with the calcium hypochlorite dihydrate crystals to seriously ruin the quality of the product.

That is, the conventional techniques are unsatisfactory from the industrial, economical and ecological considerations; for sodium hydroxide that is theoretically unnecessary is used, calcium chloride that is unavoidably by-produced from chlorination of lime is not made use of, whether or not sodium hydroxide is used in combination, or, if calcium chloride could be made use of, complicated steps and cumbersome operations are involved.

SUMMARY OF THE INVENTION

The present invention has been completed in the light of the above-described circumstances. An object of the invention is to provide a process for producing high test hypochlorite and an aqueous calcium chloride solution from the same system resulting from chlorination of lime which contains calcium hypochlorite and calcium chloride in a reasonable, economical and industrial manner.

The present inventors have searched into many prior arts and studied, seeking for a process which would accomplish the above object As a result, they have reached the following findings. (1) Lime (as calcium hydroxide) is dispersed in a calcium chloride aqueous solution (dispersing medium or dispersant). (2) Easily filtrable calcium hypochlorite dihydrate crystals can be formed by addition of the prismatic seed crystals to a system. (3) The calcium hypochlorite dihydrate can easily be produced by the reaction of lime and chlorine. (4) The calcium chloride aqueous solution as a dispersing medium can be prepared by decomposing calcium hypochlorite in the mother liquor left after separation of the dihydrate crystals.

The present invention provides a process for producing high test hypochlorite and a calcium chloride aqueous solution comprising the steps of:

(a) dispersing calcium hydroxide in an aqueous solution substantially comprising calcium chloride to prepare milk of lime, (b) chlorinating the milk of lime to crystallize calcium hypochlorite dihydrate in the presence of the prismatic calcium hypochlorite dihydrate seed crystals having the a:b:c axial ratio of $0.5 \leq b/a \leq 2.0$ and $c/a \geq 1.5$ and the c-axis of 5 μm or greater to prepare a slurry of coarse calcium hypochlorite dihydrate crystals, (c) separating the slurry into a wet cake of calcium hypochlorite dihydrate crystals and a mother liquor containing calcium hypochlorite and calcium chloride, (d) drying the wet cake of calcium hypochlorite dihydrate obtained in (c) to provide high test hypochlorite, and (e) adding hydrochloric acid to the mother liquor obtained in (c) above or bringing the mother liquor into contact with an oxide of at least one of Mn, Fe, Co, Ni, Cu, and Pd to decompose the calcium hypochlorite to obtain a calcium chloride aqueous solution.

DETAILED DESCRIPTION OF THE INVENTION

The present invention will be described below in detail.

It is an essential condition in the invention that calcium hydroxide is dispersed in an aqueous solution substantially comprising calcium chloride to prepare milk of lime. The term "substantially" as used herein means that the aqueous solution consists solely of water and calcium chloride or may contain trace amounts of sodium chloride, calcium chlorate, etc. The calcium chloride concentration in the aqueous solution is not particularly limited and is usually from 10 to 45% by weight. Where the calcium chloride concentration is low, the mother liquor in the chlorination and crystallization step has a low viscosity and is easy to handle. On the other hand, a high calcium chloride concentration is effective to achieve a high yield of calcium hypochlorite dihydrate and to secure a high concentration of the calcium chloride aqueous solution, which is another end product of the invention, thereby enhancing the economical advantage. From these viewpoints, a preferred calcium chloride concentration is 20 to 40% by weight While it is desirable that the content of other components, such as sodium chloride and calcium chlorate, be as small as possible, aqueous solutions containing the other components in a total concentration up to 5% by weight can be used suitably In a highly preferred embodiment, the aqueous solution substantially comprising calcium chloride is part of the calcium chloride aqueous solution which is obtained by decomposing calcium hypochlorite in the mother liquor from which calcium hypochlorite dihydrate has been recovered as hereinafter described. In this case, the water balance is improved, and the yield of calcium hypochlorite is increased.

Calcium hydroxide which can be used in the invention includes powdery slaked lime, lime cake obtained by filtration of milk of lime, and pasty milk of lime. The concentration is not particularly limited but is preferably as high as possible to secure a high yield of calcium hypochlorite dihydrate and a high concentration of calcium chloride produced from the same system. The concentration is preferably 30% by weight or more, still preferably 50% by weight or more, particularly preferably 95% by weight or more. While the impurity content is desirably as low as possible, slaked lime of JIS #1 grade (CaO>70.0%) or JIS #2 grade (CaO>65.0%) can be used. According to the invention, the impurities contained in slaked lime can be separated with ease to provide high-quality high test hypochlorite and a calcium chloride aqueous solution, which allows use of general-purpose cheap slaked lime. This is one of the great characteristics of the invention Dispersion of calcium hydroxide can be effected in a commonly employed stirring or dispersing apparatus. It is easy to disperse calcium hydroxide in a calcium chloride aqueous solution to prepare uniform milk of lime, which is another characteristic of the invention. Note that the dispersing time should be minimized because the viscosity of the resulting milk of lime would increase with time of dispersing. In low temperatures a complex salt of calcium chloride and calcium hydroxide, $(CaCl_2 \cdot 3Ca(OR)_2 \cdot 12H_2O)$, is sometimes produced during the dispersing, which is not a problem because the complex salt does not form lumps and will readily be consumed in the subsequent chlorination step. Formation of the complex salt is suppressed at 30° C. or higher (the temperature of the milk of lime while dispersed) and prevented at 40° C. or higher. The thus prepared milk of lime, being uniform and smooth, is easy to chlorinate, and the crystals of calcium hypochlorite dihydrate grow satisfactorily to provide high test hypochlorite with high purity. While not limiting, the concentration of the milk of lime is preferably 10 to 45% by weight, still preferably 20 to 40% by weight, in order to increase the yield of calcium hypochlorite dihydrate, to increase the concentration of calcium chloride aqueous solution, and to improve operational workability.

The aqueous solution substantially comprising calcium chloride, in which calcium hydroxide is to be dispersed, can be a recycled part of a solution that is obtained by decomposing calcium hypochlorite in the mother liquor from which calcium hypochlorite dihydrate has been separated according to the process of the invention. In this case, it is possible to control the concentration of a calcium hypochlorite dihydrate slurry obtained in the chlorination reaction hereinafter described by adjusting the amount of the recycled calcium chloride aqueous solution so that the system may have an appropriate concentration to carry out the chlorination. This is also another characteristic of the present invention.

It is another essential condition of the present invention that crystallization of calcium hypochlorite dihydrate on chlorination of the milk of lime thus prepared be carried out in the presence of added the prismatic calcium hypochlorite dihydrate seed crystals having the a:b:c axial ratio of $0.5 \leq b/a \leq 2.0$ and $c/a \geq 1.5$ and the c-axis of 5 μm or greater to prepare a slurry of coarse calcium hypochlorite dihydrate crystals.

The prismatic calcium hypochlorite dihydrate crystals which can be used as seed crystals are not particularly limited as long as they have the above specified a:b:c axial ratio This axial ratio represents such a crystal habit showing abnormally great growth in the c-axis and extremely suppressed growth in the a-axis and the b-axis. The shape of such calcium hypochlorite dihydrate crystals and the process of producing the same are disclosed, e.g., in JP-A-54-117396, in which calcium hypochlorite dihydrate is crystallized in the presence of at least one habit modifier selected from a carboxylic acid, a carboxylic acid salt and a carbohydrate to obtain the prismatic crystals. The prismatic shape includes, but are not limited to, a cylindrical shape, a tetragonal prismatic shape, a square top, double pyramidal shape, and an intermediate shapes between them. If the b:a axial ratio is out of the range specified above, the seed crystals grow insufficiently, failing to provide coarse calcium hypochlorite dihydrate crystals. If the c:a axial ratio is not greater than 1.5, or if the c-axis is less than 5 μm, the seed crystals should be used in an increased amount, or calcium hypochlorite dihydrate is crystallized as fine crystals but not as coarse crystals.

On chlorination of the milk of lime the seed crystals grow instantaneously to coarse calcium hypochlorite dihydrate crystals. The crystals show an extremely rapid growth particularly in the a-axis and the b-axis, reaching two to three times the size of conventional crystals. The grown crystals usually have a tetragonal prismatic shape or a square top, double pyramidal shape. Because the slurry comprising such crystals has a low viscosity, it is allowed to have an increased concentration and exhibits excellent filterability.

A very slight addition of the seed crystals suffices to form coarse crystals. The seed crystals are usually added in an amount of 20% by weight or less, preferably 5% by weight or less, particularly 2% by weight or less, based on the resultant coarse calcium hypochlorite dihydrate crystals. The manner of using the prismatic seed crystals is taught, e.g., in JP-A-54-127897 disclosing a process for producing coarse calcium hypochlorite dihydrate crystals which comprises adding prismatic calcium hypochlorite dihydrate seed crystals having an a:b:c axial ratio of $0.5 \leq b/a \leq 2.0$ and $c/a \geq 1.5$ and a c-axis of 5 $\mu$m or greater to a system of calcium hypochlorite dihydrate crystallization. This method can apply basically to the present invention.

Addition of the seed crystals may be either continuous or intermittent. Chlorination of the milk of lime can be carried out either in a continuous process or in a batch process, the former being preferred for high productivity and ease of operation. Any of complete mixing type crystallizers, D.T.B. type crystallizers and D.P. crystallizers can be used conveniently.

While not limiting, the slurry in continuous chlorination preferably has a concentration of 15 to 25% by weight, with which the slurry has a low viscosity, maintains uniform fluidity, shows high efficiency in chlorine gas absorption, reaching almost perfect absorption, and achieves high production efficiency. High chlorine gas absorption efficiency means not only effective utilization of the raw material but suppression of chlorine gas discharge, which leads to reduction of load on an exhaust removal system and to environmental conservation.

While not limiting, the mother liquor of the system in the continuous chlorination preferably has a calcium hypochlorite content of 2 to 7% by weight and a calcium chloride content of 20 to 40% by weight. This composition is advantageous in that the rate of chlorine gas absorption is high, the seed crystals show satisfactory growth, and the subsequent decomposition of calcium hypochlorite is easy to carry out to provide a high concentration calcium chloride aqueous solution, which is good for economies.

The chlorination and crystallization temperature, which is not particularly limited, is usually 5 to 50° C., preferably 10 to 40° C. In this temperature range, thermal decomposition of calcium hypochlorite can be inhibited, and a high rate of seed crystal growth is secured. The temperature being close to ambient temperature, the heat of chlorination can be removed easily, which is highly economical.

The resulting slurry containing coarse calcium hypochlorite dihydrate crystals is then separated into a wet cake of calcium hypochlorite dihydrate crystals and a mother liquor containing calcium hypochlorite and calcium chloride.

The separation is conducted in either a batch process or a continuous process. Commonly employed solid-liquid separators can be used, such as a centrifuge, a horizontal belt filter, a drum filter, and a filter press. It is preferred for improved separation to previously thicken the slurry to increase the concentration. A thickener, a hydrocyclone, etc., can be used for thickening.

The separation is extremely easy, and a wet cake of high concentration calcium hypochlorite dihydrate which is easy to handle can be obtained in a short time. The calcium hypochlorite dihydrate concentration in the cake is usually 60% by weight or higher, preferably 70% by weight or higher. The cake may be washed with water. Washing is so easy that the mother liquor attached to the cake can be washed away with a small amount of water to provide a high purity wet cake. For example, the cake can be washed with 5 to 30% by weight of water in a centrifuge to become a wet cake having a calcium hypochlorite content of 60 to 75% by weight and a calcium chloride content of not more than 5% by weight. The filtrate and the washing may be combined or treated separately. When treated separately, the washing could be used for dispersing calcium hydroxide to achieve improved dispersing operation.

The wet cake of calcium hypochlorite dihydrate is dried to give high test hypochlorite, one of the objective products of the invention Since the wet cake has a high calcium hypochlorite concentration with a small water content, it dries easily to remove the water content in a short time to provide high test hypochlorite of high quality Any commonly employed driers can be used, such as a pneumatic conveying drier, a fluidized bed drier, a paddle drier, and a conical drier The drying can be performed in either a continuous manner or a batchwise manner.

While the drying is to remove surface water, water of crystallization may also be removed. The calcium hypochlorite content in the high test hypochlorite thus prepared is as high as 70% by weight or more. It can reach 80% by weight or more, sometimes 90% by weight or even higher. Sodium chloride powder may be added thereto to adjust the calcium hypochlorite content generally in a range of from 60 to 80% by weight. The water content usually ranges from 3 to 30% by weight. To enhance safety and stability of the high test hypochlorite, the water content is preferably 7 to 27% by weight. The high test hypochlorite thus prepared further contains calcium chloride, sodium chloride, calcium chlorate, etc. usually in a total content of about 5 to 30% by weight.

After the calcium hypochlorite dihydrate is separated, calcium hypochlorite contained in the resultant mother liquor (also containing calcium chloride) is decomposed by adding hydrochloric acid to the mother liquor or bringing the mother liquor into contact with an oxide of at least one of Mn, Fe, Co, Ni, Cu, and Pd, thereby to provide an aqueous solution of calcium chloride.

One of the gists of the present invention consists in the decomposition of calcium hypochlorite Decomposition of calcium hypochlorite results in production of a calcium chloride aqueous solution of high value, a part of which can be used as a dispersant for calcium hydroxide as described above to prepare a homogeneous and highly reactive milk of lime. That is, the decomposition plays an extremely important role in the present invention for the operation and economies, being the key point to establishment of the process for producing both high test hypochlorite and a calcium chloride aqueous solution. While the most part of the calcium hypochlorite to be decomposed is in a dissolved state, the mother liquor may contain the calcium hypochlorite dihydrate crystals that have escaped the preceding separation operation. Further, the mother liquor to be treated here may be a liquid having the calcium hypochlorite concentration reduced which is obtained by adding calcium hydroxide to the mother liquor from which calcium hypochlorite dihydrate has been recovered to precipitate hemibasic calcium hypochlorite ($Ca\ (ClO)_2 \cdot \frac{1}{2}Ca(OH)_2$) or dibasic calcium hypochlorite ($Ca(ClO)_2 \cdot 2Ca(OH)_2$) or a liquid having the calcium hypochlorite concentration reduced which is obtained by cooling the mother liquor from which calcium hypochlorite dihydrate has been recovered to further precipitate calcium hypochlorite dihydrate. The precipitate recovered by these pretreatments can be recycled to the chlorination step, etc. and recovered as high test hypochlorite.

Where decomposition of calcium hypochlorite is carried out by the reaction with hydrochloric acid, the reaction is a solution reaction, in which chlorine formation shown below proceeds uniformly, rapidly, and almost quantitatively.

$$Ca(ClO)_2 + 4HCl \rightarrow CaCl_2 + 2Cl_2\uparrow + 2H_2O$$

The produced chlorine can be made use of for chlorination of milk of lime. The higher the reaction temperature, the higher the reaction rate, and the higher the chlorine recovery. Taking anticorrosion of the equipment into consideration, a preferred reaction temperature is 20 to 80° C., particularly 30 to 60° C. Since the reaction is exothermic, heating does not need much energy. Proceeding at a high rate, the reaction completes in a short treating time. Usually 0.2 to 5 hours would be enough for complete decomposition. The reaction can be effected either in a batch process or a continuous process. A continuous process is preferred for productivity and operational workability. The higher the concentration of hydrochloric acid, the higher the calcium chloride concentration obtained. From this standpoint, hydrogen chloride gas is less applicable, difficult to handle, and less economical. Hydrochloric acid having a concentration of 20 to 35% by weight, preferably 30 to 35% by weight, is usually used.

The above decomposition reaction with hydrochloric acid is accompanied by decomposition of calcium chlorate, which has been by-produced in a small amount in the chlorination of milk of lime, as shown below.

$$Ca(ClO_3)_2 + 12HCl \rightarrow CaCl_2 + 6Cl_2\uparrow + 6H_2O$$

Where decomposition of calcium hypochlorite in the mother liquor is carried out by bringing the mother liquor into contact with an oxide of at least one of Mn, Fe, Ni, Co, Cu, and Pd (hereinafter referred to as an oxide of Mn, etc.), the reaction is basically a catalytic reaction shown below.

$$Ca(ClO)_2 \rightarrow CaCl_2 + O_2\uparrow$$

Since the reaction products are calcium chloride, which is an objective substance, and oxygen gas, the reaction needs no exhaust removal system and is rather beneficial to environmental conservation. Further, in the above-described case of the decomposition reaction with hydrochloric acid, the resulting reaction mixture has a calcium chloride concentration reduced by the water originated in the hydrochloric acid and the produced water, while in this catalytic reaction the calcium chloride concentration is rather increased. Furthermore, no chemical reagent is consumed. For these reasons in conjunction with the higher workability and better economies taken into consideration, the decomposition using an oxide of Mn, etc., is preferable to the decomposition with hydrochloric acid - For example, where a mother liquor having a calcium hypochlorite concentration of 6.3% by weight and a calcium chloride concentration of 31.1% by weight is treated with an oxide of Mn, etc., there is obtained an aqueous solution containing calcium chloride in a concentration of about 36% by weight.

The oxide of Mn, etc. which can be used in the invention is at least one of an oxide (inclusive of a peroxide) and a hydroxide (inclusive of an oxyhydroxide that is an oxide and hydroxide) of Mn, etc. Examples of suitable oxides of Mn, etc. are $Mn(OH)_2$, $MnO$, $MnO_2$, $Mn_2O_3$, $Mn_3O_4$, $Fe(OH)_2$, $Fe(OH)_3$, $Fe_2O_3$, $Fe_3O_4$, $FeO$, $Co(OH)_2$, $Co(OH)_3$, $CO_2O_3$, $CO_3O_4$, $CoO_2$, $Ni(OH)_2$, $NiO$, $Ni_2O_3$, $NiO_2$, $NiOOH$, $Cu(OH)_2$, $CuO$, $Cu_2O$, $Pd(OH)_2$, $PdO$, $Pd_2O_3$, $PdO_2$, and $PdO_3$. Preferred of them are oxides of Ni, Co or Pd, which exert great decomposing ability in a small amount and have a long duration as a catalyst. Ni oxides are particularly economical.

These metal oxide catalysts may be used either as a powder or in a molded form, such as pellets or spheres. When molded, they may be used in combination with known organic or inorganic binders. It is a preferred embodiment that the oxide of Mn, etc., is used as supported on an organic cation exchanger to markedly improve the workability and the decomposing ability. In particular, the oxide of Mn, etc., supported on an fluorine type organic ion exchanger (hereinafter referred to as a metal oxide-on-ion exchanger catalyst) exhibits high anticorrosion while suppressing adhesion of a calcium or a magnesium compound. Such a metal oxide-on-ion exchanger catalyst is obtainable by, for example, exchanging the counter ion (cation) of a fluorine type cation exchanger for an Mn cation, etc. and treating the cation exchanger with an alkali and/or an oxidizing agent, as is disclosed in JP-A-6-23375. Basically the technique disclosed in JP-A-6-23375 applies to the preparation of the metal oxide-on-ion exchanger catalyst for use in the invention.

Decomposition of calcium hypochlorite in the mother liquor in the presence of the oxide of Mn, etc. can be carried out either on a suspended bed or on a fixed bed and either in a batch process or in a continuous process. For the ease of operation, a suspended bed and a continuous process are preferred.

As previously stated, part of the calcium chloride aqueous solution obtained by decomposition of calcium hypochlorite can be used as a dispersant for calcium hydroxide in the preparation of milk of lime, and the remainder can be taken out of the system as an end product to be put on the market. Where used as a dispersant for calcium hydroxide, calcium hydroxide powder can be dispersed to give homogeneous milk of lime with satisfactory workability and a good water balance without forming lumps. If desired, the reaction mixture after the decomposition may be filtered, and the filtrate can be used as a dispersant or an end product.

Cases are sometimes met in which the reaction mixture after the decomposition in the presence of the oxide of Mn, etc., contains a small amount of calcium chlorate, which can be completely decomposed by addition of at least a reducing equivalent of hydrochloric acid. Hydrochloric acid is preferably added in an amount of 1 to 5 equivalents, particularly 1.1 to 3 equivalents. As the reaction temperature is raised, the reaction rate increases. However, in order to minimize the energy consumption and to avoid the necessity of upgrading the reactor by glass lining, etc., the reaction is conducted usually at 30 to 100° C., preferably 40 to 90° C. The treating time is from 0.2 to 5 hours, preferably 0.3 to 2 hours. The reaction is preferably performed in a continuous process. As mentioned above, part of the resulting calcium chloride aqueous solution in which calcium chlorate has been decomposed can be used as a dispersant for calcium hydroxide, and the remainder can be taken out of the system as an end product.

In some cases, part of chlorine gas generated by decomposition of calcium hypochlorite with hydrochloric acid or decomposition of calcium chlorate with hydrochloric acid may dissolve in the aqueous calcium chloride solution. In such cases, the dissolved chlorine maybe removed by using a sulfite. A sulfite is preferably added in an amount of 1.0 to 3.0 equivalents, particularly 1.1 to 2.0 equivalents, for reduction. The treatment is preferably carried out at 40 to 90° C. for 0.2 to 2.0 hours, thereby to reduce and eliminate dissolved chlorine completely. In this case, too, part of the resulting solution, either as it is or after filtration, can be used as a dispersant for calcium hydroxide, and the remainder can be used as an end product.

If desired, the calcium chloride aqueous solution thus obtained may be neutralized with, for example, milk of lime to precipitate trace amounts of dissolved impurity metals, Fe, Al, etc., as sparingly water-soluble precipitates, which are removed by filtration. The neutralization is preferably conducted at pH 5 to 9, at 40 to 90° C. for 0.2 to 2.0 hours in a continuous manner. The thus treated calcium chloride aqueous solution has high purity, containing no impurities. It can be used effectively and economically as a dispersant for calcium hydroxide and as a final product.

According to the end use, the calcium chloride aqueous solution obtained by the process of the invention may be concentrated into a high concentration calcium chloride aqueous solution or may be formed into granules.

The present invention will now be illustrated in greater detail with reference to Example and Comparative Example, but it should be noted that the invention is not construed as being limited thereto. Unless otherwise noted, all the percents and parts are by weight.

EXAMPLE

To a mixing tank equipped with a stirrer and an overflow pipe were continuously fed 2.1 part/hr of a 35.3% calcium chloride aqueous solution, 1.7 part/hr of water, and 1.3 part/hr of 96% slaked lime at 30° C., and a lime slurry (milk of lime) containing 24.1% of $Ca(OH)_2$ and 14.4% of $CaCl_2$ was withdrawn continuously. The average residence time was 0.5 hour. The resulting lime slurry was smooth and homogeneous and had no lump of powder.

The lime slurry was continuously fed to a cylinder crystallizer equipped with an overflow pipe, a stirrer, and a cooling coil at a rate of 4.8 part/hr and, at the same times, 1.1 part/hr of chlorine gas and 0.11 part/hr of a 7% slurry of prismatic seed crystals prepared as described below were fed continuously. The temperature was set at 30° C., and the average residence time was 5 hours. The chlorination easily proceeded, and the chlorine gas was completely absorbed. The slurry kept a low viscosity. The prismatic seed crystals easily grew into coarse calcium hypochlorite dihydrate crystals in a short time without producing small particles. The slurry containing the coarse calcium hypochlorite dihydrate crystals in a concentration of 19% was continuously withdrawn through the overflow pipe.

Preparation of Prismatic Seed Crystals

Into a 2 liter crystallizer equipped with a stirrer were put 112 parts of calcium hydroxide, 239 parts of 48% aqueous sodium hydroxide, 449 parts of water, and 3 parts of citric acid. Chlorine gas was blown into the mixture at a rate of about 100 g/hr·l while maintaining the mixture at 20° C. After completion of the chlorination, only the stirring was continued at the same temperature for about 15 hours to obtain crystals having an a- and a b-axis of 5 to 15 μm and a c-axis of 20 to 120 μm with a c/a axial ratio of about 7 and a b/a axial ratio of 1.0. The resulting slurry was filtered, and the filter cake was reslurried in a solution containing 8% of $Ca(ClO)_2$ and 20% of $CaCl_2$ to prepare a prismatic seed crystal slurry.

The coarse calcium hypochlorite dihydrate crystals were square top, double pyramidal crystals having an a- and a b-axis of 10 to 100 μm and a c-axis of 5 to 300 μm, which were large enough to settle satisfactorily.

The coarse calcium hypochlorite dihydrate slurry was filtered by means of a basket type centrifuge, washed with a small amount of water to leave a cake of calcium hypochlorite dihydrate having a $Ca(ClO)_2$ content of 63%. The filtration and the following washing operations were accomplished with great ease in a short time to afford a cake easy to handle and having a low content of surface water. In order to adjust the available chlorine content, the cake was mixed with 5% of sodium chloride particles and dried.

Mixing of sodium chloride was achieved with ease to give a uniform mixture, which dried in a short time with little accompanying decomposition of $Ca(ClO)_2$ to provide high test hypochlorite of high quality which contained substantially no water-insoluble matter. The resulting high test hypochlorite comprised 75% of $Ca(ClO)_2$, 7.4% of NaCl, 3.1% of $CaCl_2$, and 10% of $H_2O$.

After the centrifugal separation of calcium hypochlorite dihydrate grains, the mother liquor, which comprised 7.1% of $Ca(ClO)_2$, 31.0% of $CaCl_2$, 0.2% of $Ca(ClO_3)_2$, and a small amount of calcium hypochlorite dihydrate crystals, was continuously fed to a cylinder decomposition tank (two tanks connected in series) equipped with a stirrer and an overflow pipe into which a suspension of supported $Ni_2O_3$ catalyst prepared as described below had been put beforehand. The reaction was carried out at 70° C. and for a residence time of 4 hours.

Preparation of Supported $Ni_2O_3$ Catalyst

A fluorine type organic cation exchanging membrane Nafion 954 (available from E. I. Du Pont) which had been used for sodium chloride electrolysis was washed well and cut into pieces 10 mm by 10 mm. In a 2-liter beaker were put 1.5 liters of an 1N $NiCl_2$ aqueous solution and 300 g (on a wet basis) of the cut pieces of the cation exchanging membrane, and the mixture was stirred for 1.0 hour to effect ion exchange. The supernatant liquid was taken out, and another 1.5 liter 1N $NiCl_2$ aqueous solution was put in the beaker, followed by stirring for 1.0 hour. The supernatant liquid was discarded, and the thus ion-exchanged ion exchanger was transferred to a 2-liter beaker containing 1.5 liters of a 3.0% NaClO aqueous solution (pH=10), whereupon the nickel ions were converted to a black oxide. The oxide adsorbed onto the surface of the ion exchanger was identified to be $Ni_2O_3$ by X-ray photo electron spectrometry. It was found that 63% of the supported $Ni_2O_3$ was in the inside of the ion exchanger. The ratio of Ni to the total dry weight of the supported $Ni_2O_3$ catalyst was 2.0%.

The supported $Ni_2O_3$ catalyst was used at a suspension density of 80 g/l. The decomposition of the $Ca(ClO)_2$ in the presence of the supported $Ni_2O_3$ catalyst was conducted in accordance with the aforementioned procedures. As a result, the calcium hypochlorite was easily and effectively decomposed to give a reaction mixture comprising 0.3% of $Ca(ClO)_2$, 36.1% of $CaCl_2$, and 0.5% of $Ca(ClO_3)_2$. It is seen that the rate of decomposition of $Ca(ClO)_2$ reached 96%. It is easily recognizable that this decomposition reaction produces calcium chloride and eco-friendly oxygen.

To the reaction mixture was continuously added 35% hydrochloric acid in an amount of 9% based on the reaction mixture, whereby $Ca(ClO_3)_2$ was completely decomposed. Further, sodium sulfite (20% aqueous solution) was added thereto in an amount three times the reducing equivalent for the residual free chlorine in the reaction mixture thereby to decompose free chlorine. The resulting reaction mixture was neutralized with milk of lime while measuring with a pH meter, followed by filtration. The filtrate contained 35.3% of $CaCl_2$ and not more than 1% of NaCl, with no $Ca(ClO)_2$ nor $Ca(ClO_3)_2$ being detected, and with metal ions of Fe, Ni, Al, etc., having been precipitated and removed, proving to be a high quality calcium chloride aqueous solution.

Part of the calcium chloride aqueous solution was recycled to the first step as a dispersant for slaked lime at a feed rate of 2.1 part/hr. Slaked lime was dispersed and emulsified with the recycled dispersant extremely satisfactorily without forming lumps of powder to provide a homogeneous lime slurry. The subsequent chlorination of the resulting lime slurry was carried out satisfactorily so that chlorine gas was absorbed completely, the slurry viscosity was low, and the prismatic seed crystals showed satisfactory growth into large grains In this recycling system, the water balance was satisfactory, and the yield of Ca(ClO)$_2$ was high. The yield of calcium hypochlorite dihydrate was 83% on a chlorine basis.

Comparative Example

The same operations of Example were repeated, except that slaked lime was dispersed in a minimal amount of water to prepare a lime slurry having the maximum concentration possible to handle.

It was ascertained that the concentration of the lime slurry at which a viscosity of not higher than 2,000 cP (the upper limit for securing ease of handling) could be maintained, and at which a high chlorine absorption could be reached in the step of chlorination and crystallization was 35%. Hence, the concentration of the lime slurry was kept at 35% by feeding 2.3 part/hr of water. There was obtained a homogeneous lime slurry with, of necessity, no lumps of powder formed In the chlorination step, unreacted chlorine gas was exhausted slightly, which was removed by absorption in aqueous sodium hydroxide. The prismatic seed crystals showed satisfactory growth into coarse square top, double pyramidal crystals of calcium hypochlorite dihydrate. The crystal slurry had a concentration of 25% and therefore had a high viscosity so that the chlorine gas seemed to have escaped partly. The yield of the coarse calcium hypochlorite dihydrate crystals to the fed chlorine was lower than that of Example by 12%, proving the process less economical. The mother liquor after filtering the dihydrate crystals contained 8% of Ca(ClO)$_2$ and 21% of CaCl$_2$. The calcium chloride aqueous solution obtained by purifying the mother liquor in the same manner as in Example had a concentration of 28%, which is lower than that of Example (35%) by 7%, and needed concentration before it was put on the market.

As described above, the present invention provides a highly productive, economical and ecologically-sound process for producing both high test hypochlorite and a calcium chloride aqueous solution.

The effects brought about by the present invention are summarized below.
(1) High quality high test hypochlorite and a high purity calcium chloride aqueous solution are produced from the same system through a single series of steps.
(2) The main raw materials are chlorine and slaked lime, which are economical.
(3) Uniform milk of lime to be chlorinated is prepared easily. General-purpose slaked lime can be made use of; and yet lumps of powder are not formed, and the process can be carried out with satisfactory workability to provide high quality high test hypochlorite.
(4) A satisfactory water balance is secured, and a high concentration calcium chloride aqueous solution is obtained.
(5) Since the mother liquor is processed into a valuable calcium chloride aqueous solution, there is generated no waste liquid containing effective chlorine such as calcium hypochlorite, or metals, which is very favorable for environmental conservation.
(6) A calcium chloride aqueous solution having high purity and high concentration can easily be recovered from the mother liquor after collecting calcium hypochlorite dihydrate crystals.

While the invention has been described in detail and with reference to specific embodiments thereof, it will be apparent to one skilled in the art that various changes and modifications can be made therein without departing from the spirit and scope thereof.

What is claimed is:

1. A process for producing high test hypochlorite and a calcium chloride aqueous solution comprising the steps of:
   (a) dispersing calcium hydroxide in an aqueous solution substantially comprising calcium chloride to prepare milk of lime,
   (b) chlorinating said milk of lime to crystallize calcium hypochlorite dihydrate in the presence of the prismatic calcium hypochlorite dihydrate seed crystals having an a:b:c axial ratio of $0.5 \leq b/a \leq 2.0$ and $c/a \geq 1.5$ and a c-axis of 5 μm or greater to prepare a slurry of coarse calcium hypochlorite dihydrate crystals,
   (c) separating said slurry into a wet cake of calcium hypochlorite dihydrate crystals and a mother liquor containing calcium hypochlorite and calcium chloride,
   (d) drying said wet cake of calcium hypochlorite dihydrate obtained in (c) to provide high test hypochlorite, and
   (e) adding hydrochloric acid to said mother liquor obtained in (c) above or bringing said mother liquor into contact with an oxide of at least one of Mn, Fe, Co, Ni, Cu, and Pd to decompose said calcium hypochlorite to obtain a calcium chloride aqueous solution.

2. The process according to claim 1, wherein said aqueous solution substantially comprising calcium chloride used in (a) is part of said calcium chloride aqueous solution obtained in (e).

3. The process according to claim 1, wherein the crystallization of calcium hypochlorite dihydrate in (b) is carried out in a continuous manner under conditions of 5 to 50° C. in crystallizing temperature and 15–25% by weight in coarse calcium hypochlorite dihydrate concentration in the slurry and wherein in step (c) the mother liquor has a concentration of 2 to 7% by weight in calcium hypochlorite and 20 to 40% by weight of calcium chloride.

4. The process according to claim 1, wherein a calcium chloride concentration in said aqueous solution used in (a) is 20 to 40% by weight.

5. The process according to claim 1, wherein the concentration of calcium hydroxide used in (a) is 30% by weight or more.

6. The process according to claim 1, wherein the temperature in step (a) is 30° C. or higher.

7. The process according to claim 1, wherein the concentration of the milk of lime is 10 to 45% by weight.

8. The process according the claim 1, wherein the seed crystals used in step (b) are added in an amount of 20% by weight or less based on the resulting calcium hypochlorite dihydrate crystals.

9. The process according to claim 1, wherein step (b) is carried out in a continuous manner and the slurry in (b) has a concentration of 15 to 25% by weight.

10. The process according to claim 1, wherein the chlorination and crystallization temperature in (b) is 5 to 50° C.

11. The process according to claim 1, wherein the hydrochloric acid used in (e) has a concentration of 20 to 35% by weight.

12. The process according to claim 1, wherein said mother liquor is brought into contact with an oxide of at least one of Mn, Fe, Co, Ni, Cu, and Pd in (e).

13. The process according to claim 12, wherein the oxide of at least one of Mn, Fe, Co, Ni, Cu, and Pd is selected from the group consisting of Mn(OH)$_2$, MnO, MnO$_2$, Mn$_2$O$_3$, Mn$_3$O$_4$, Fe(OH)$_2$, Fe(OH)$_3$, Fe$_2$O$_3$, Fe$_3$O$_4$, FeO, Co(OH)$_2$, Co(OH)$_3$, Co$_2$O$_3$, Co$_3$O$_4$, CoO$_2$, Ni(OH)$_2$, NiO, Ni$_2$O$_3$, NiO$_2$, NiOOH, Cu(OH)$_2$, CuO, Cu$_2$O, Pd(OH)$_2$, PdO, Pd$_2$O$_3$, PdO$_2$, and PdO$_3$.

* * * * *